(12) United States Patent
Sharma et al.

(10) Patent No.: US 11,223,631 B2
(45) Date of Patent: Jan. 11, 2022

(54) SECURE COMPLIANCE PROTOCOLS

(71) Applicant: Hewlett Packard Enterprise Development LP, Houston, TX (US)

(72) Inventors: Puneet Sharma, Palo Alto, CA (US); Arun Raghuramu, Palo Alto, CA (US); David Lee, Atherton, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 420 days.

(21) Appl. No.: 15/947,052

(22) Filed: Apr. 6, 2018

(65) Prior Publication Data

US 2019/0312855 A1      Oct. 10, 2019

(51) Int. Cl.
*H04L 12/26* (2006.01)
*H04L 12/40* (2006.01)
(Continued)

(52) U.S. Cl.
CPC ........ *H04L 63/123* (2013.01); *G06F 9/45558* (2013.01); *G06F 16/1834* (2019.01);
(Continued)

(58) Field of Classification Search
CPC ................. G06F 16/1834; G06F 16/27; G06F 2009/45587; G06F 2009/45595; G06F 21/64; G06F 21/57; G06F 21/552; G06F 21/602; G06F 2221/2151; G06F 2221/064; G06F 9/45558; G06F 9/45533; H04L 63/0485; H04L 63/0492; H04L 63/123; H04L 67/10; H04L 67/12; H04L 67/18; H04L 9/3239; H04L 9/3297; H04L 9/0857; H04L 2209/127; H04L 2209/38; H04L 2209/84; H04W 12/1006; H04W 4/021; H04W 4/40; H04W 4/70
See application file for complete search history.

(56) References Cited

U.S. PATENT DOCUMENTS 10,195,513 B2 *  2/2019  Tran ........................ H04L 9/321
10,313,360 B2 *  6/2019  Wilson ................. G06Q 20/145
(Continued)

FOREIGN PATENT DOCUMENTS

WO      WO-2017011601          1/2017

OTHER PUBLICATIONS

J. Clemens, R. Pal and B. Sherrell, "IoTA: IoT Assurance (Host 2017 Hardware Demo Submission)," 2017. (Year: 2017).*
(Continued)

*Primary Examiner* — Michael Simitoski
(74) *Attorney, Agent, or Firm* — Brooks, Cameron & Huebsch, PLLC

(57) ABSTRACT

In some examples, a secure compliance protocol may include a virtual computing instance (VCI) deployed on a hypervisor and may be provisioned with hardware computing resources. In some examples the VCI may also include a cryptoprocessor to provide cryptoprocessing to securely communicate with a plurality of nodes, and a plurality of agents to generate a plurality of compliance proofs; the VCI may communicate with a server corresponding to a node of the plurality of nodes; and receive a time stamp corresponding to at least one compliance proof based on a metric of a connected device.

14 Claims, 6 Drawing Sheets

(51) Int. Cl.

| | | |
|---|---|---|
| *G06F 11/30* | (2006.01) | |
| *G06F 21/57* | (2013.01) | |
| *H04L 29/06* | (2006.01) | |
| *G06F 9/455* | (2018.01) | |
| *G06F 21/64* | (2013.01) | |
| *G06F 16/27* | (2019.01) | |
| *G06F 16/182* | (2019.01) | |
| *H04W 4/70* | (2018.01) | |
| *H04L 9/32* | (2006.01) | |
| *H04W 12/106* | (2021.01) | |
| *G06F 21/55* | (2013.01) | |
| *H04W 4/40* | (2018.01) | |
| *H04L 29/08* | (2006.01) | |
| *H04W 4/021* | (2018.01) | |

(52) U.S. Cl.
CPC .............. *G06F 16/27* (2019.01); *G06F 21/64* (2013.01); *H04L 9/3297* (2013.01); *H04L 63/0485* (2013.01); *H04L 63/0492* (2013.01); *H04W 4/70* (2018.02); *H04W 12/106* (2021.01); *G06F 2009/45587* (2013.01); *G06F 2009/45595* (2013.01); *H04L 67/12* (2013.01); *H04L 2209/127* (2013.01); *H04L 2209/38* (2013.01); *H04W 4/021* (2013.01); *H04W 4/40* (2018.02)

(56) References Cited

U.S. PATENT DOCUMENTS

| | | | | |
|---|---|---|---|---|
| 2010/0121928 | A1* | 5/2010 | Leonard .............. | H04L 63/1433 709/206 |
| 2011/0138188 | A1* | 6/2011 | Lee ........................ | G06F 21/57 713/187 |
| 2012/0254960 | A1* | 10/2012 | Lortz .................... | H04L 63/104 726/7 |
| 2014/0108784 | A1 | 4/2014 | Pendarakis et al. | |
| 2014/0109191 | A1* | 4/2014 | Raghuram .......... | H04L 63/0884 726/4 |
| 2015/0248286 | A1* | 9/2015 | Kotani ................ | G06F 9/45533 717/172 |
| 2016/0275461 | A1* | 9/2016 | Sprague ................ | H04W 12/06 |
| 2017/0046709 | A1 | 2/2017 | Lee et al. | |
| 2017/0134162 | A1 | 5/2017 | Code et al. | |
| 2017/0237570 | A1 | 8/2017 | Vandervort | |
| 2017/0244565 | A1* | 8/2017 | Bronk ................... | H04L 63/126 |
| 2017/0364450 | A1 | 12/2017 | Struttmann | |
| 2018/0018723 | A1 | 1/2018 | Nagla et al. | |
| 2018/0091596 | A1* | 3/2018 | Alvarez .................. | H04L 67/12 |
| 2018/0268491 | A1* | 9/2018 | Cuomo .............. | G06Q 10/0833 |
| 2018/0287780 | A1* | 10/2018 | Safford .................. | G06F 21/51 |
| 2018/0288101 | A1 | 10/2018 | Sharma et al. | |
| 2018/0337769 | A1* | 11/2018 | Gleichauf ............ | G06Q 20/065 |
| 2019/0014124 | A1* | 1/2019 | Reddy .................. | H04L 63/108 |
| 2019/0034919 | A1* | 1/2019 | Nolan .............. | G06Q 20/38215 |
| 2019/0132422 | A1* | 5/2019 | Ran ...................... | H04L 43/087 |
| 2019/0138716 | A1* | 5/2019 | Huang ................... | H04L 63/20 |
| 2020/0026290 | A1* | 1/2020 | Lim ...................... | G06Q 50/30 |
| 2020/0178198 | A1* | 6/2020 | Ding ..................... | G07C 5/008 |

OTHER PUBLICATIONS

Lauer, Hagen, and Nicolai Kuntze. "Hypervisor-based attestation of virtual environments." 2016 Intl IEEE Conferences on Ubiquitous Intelligence & Computing, Advanced and Trusted Computing, Scalable Computing and Communications . . . (Year: 2016).*

Liu, He, et al. "Software abstractions for trusted sensors." Proceedings of the 10th international conference on Mobile systems, applications, and services. 2012. (Year: 2012).*

Sheehy, Justin, et al. "Attestation: evidence and trust." Mitre Technical Paper, March (2007). (Year: 2007).*

International Search Report and Written Opinion received for PCT Application No. PCT/US2019/026143, dated Aug. 27, 2019, 17 pages.

The Economist, "The driverless, car-sharing road ahead", available online at <https://web.archive.org/web/20160109092853/https://www.economist.com/news/business/21685459-carmakers-increasingly-fret-their-industry-brink-huge-disruption>, Jan. 6, 2016, 4 pages.

Villasenor, John, "Products Liability and Driverless Cars: Issues and Guiding Principles for Legislation", Brookings, Apr. 2014, 25 pages.

Valdes-Dapena, Peter, "Can we trust driverless cars?", CNNMoney (New York), Jul. 2, 2016, 12 pages.

Szabo, Nick, "The Idea of Smart Contracts", Nick Szabo's Papers and Concise Tutorials, 1997, 2 pages.

Portfolio Media. Inc., "A State-By-State Guide To Driverless Car Regulations", Law360, Jul. 20, 2016, 4 pages.

Pfanner et al., "Toyota Setting Up Major Research Lab in Silicon Valley", The Wall Street Journal, available online at <https://www.wsj.com/articles/toyota-to-invest-1-billion-in-artificial-intelligence-firm-1446790646>, 2015, 3 pages.

Greenblatt, Nathan A., "Self-Driving Cars Will Be Ready Before Our Laws Are", IEEE Spectrum, Jan. 19, 2016, 9 pages.

Cyberwiki, "Automated Driving: Legislative and Regulatory Action", available online at <http://cyberlaw.stanford.edu/wiki/index.php/Automated_Driving:_Legislative_and_Regulatory_Action>, 2017, 14 pages.

Bryant Walker Smith, "Automated Vehicles are Probably Legal in the United States", Center for Internet and Society, Nov. 1, 2012, 99 pages.

Behere et al., "A functional architecture for autonomous driving", First International Workshop on Automotive Software Architecture (WASA), 2015, 8 pages.

Andy Greenberg, "Hackers Remotely Kill a Jeep on The Highway—With Me in It" Wired, 2015, 26 pages.

Andy Greenberg, "Hackers Cut a Corvette's Brakes Via a Common Car Gadget", Wired, 2015, 15 pages.

Andy Greenberg, "After Jeep Hack, Chrysler Recalls 1.4M Vehicles for Bug Fix", Wired, 2015, 15 pages.

Andrew J. Hawkins, "Uber's self-driving cars are now picking up passengers in Arizona", The Verge, Feb. 21, 2017, 8 pages.

Andrew J. Hawkins, "Uber dismissed warnings about its illegal self-driving test for months, emails show", The Verge, Feb. 27, 2017, 9 pages.

Andrea Peterson, "Researchers remotely hack Tesla Model S", The Washington Post, Sep. 20, 2016, 7 pages.

Anderson et al., "Autonomous Vehicle Technology: A Guide for Policymakers", RAND Corporation, 2016, 214 pages.

Alissa Walker, "Why Uber's self-driving program failed in San Francisco", Curbed, Dec. 22, 2016, 8 pages.

"Testing of Autonomous Vehicles with a Driver", available online at <https://www.dmv.ca.gov/portal/dmv/detail/vr/autonomous/testing>, retrieved on Nov. 15, 2018, 4 pages.

"Requirements for Hardware-Protected Security for Ground Vehicle Applications", J3101, available online at <https://www.sae.org/standards/content/j3101/>, 2012, 2 pages.

Alan Tatourian, "Why TPM in Automotive?", Trusted Computing Group, Mar. 21, 2017, pp. 1-13.

Prof. Antonio Mauro, "Cyber Security on Vehicles", European Crime Prevention Network, 2015, pp. 1-27.

Blockchain Technology as a Regulatory Technology: From Code is Law to Law is Code, (Research Paper), Dec. 2016, vol. 21, 17 Pgs.

CyberCar Successfully Uses Blockchain to Deliver Connected Car Data Authentication, (Web Page), Jul. 19, 2017, 3 Pgs.

IoT 20/20: Smart and Secure IoT Platform, (White Paper), Retrieved Nov. 21, 2017, 105 Pgs.

IoT Security: An IBM Position Paper, (Technical Paper), Retrieved Nov. 21, 2017, 21 Pgs.

The Future of IoT: Blockchain Biometrics with HYPR, (Web Page), Retrieved Nov. 21, 2017, 10 Pgs.

Trustable Connected Vehicles—Measureable Security and Privacy for Smart Cars, (Web Page), Retrieved Nov. 21, 2017, 9 Pgs.

* cited by examiner

SECURE COMPLIANCE PROTOCOLS

BACKGROUND

Compliance protocols may refer to a way to provide a proof of compliance of a device to an entity requesting the proof of compliance.

DETAILED DESCRIPTION

Figure 1:
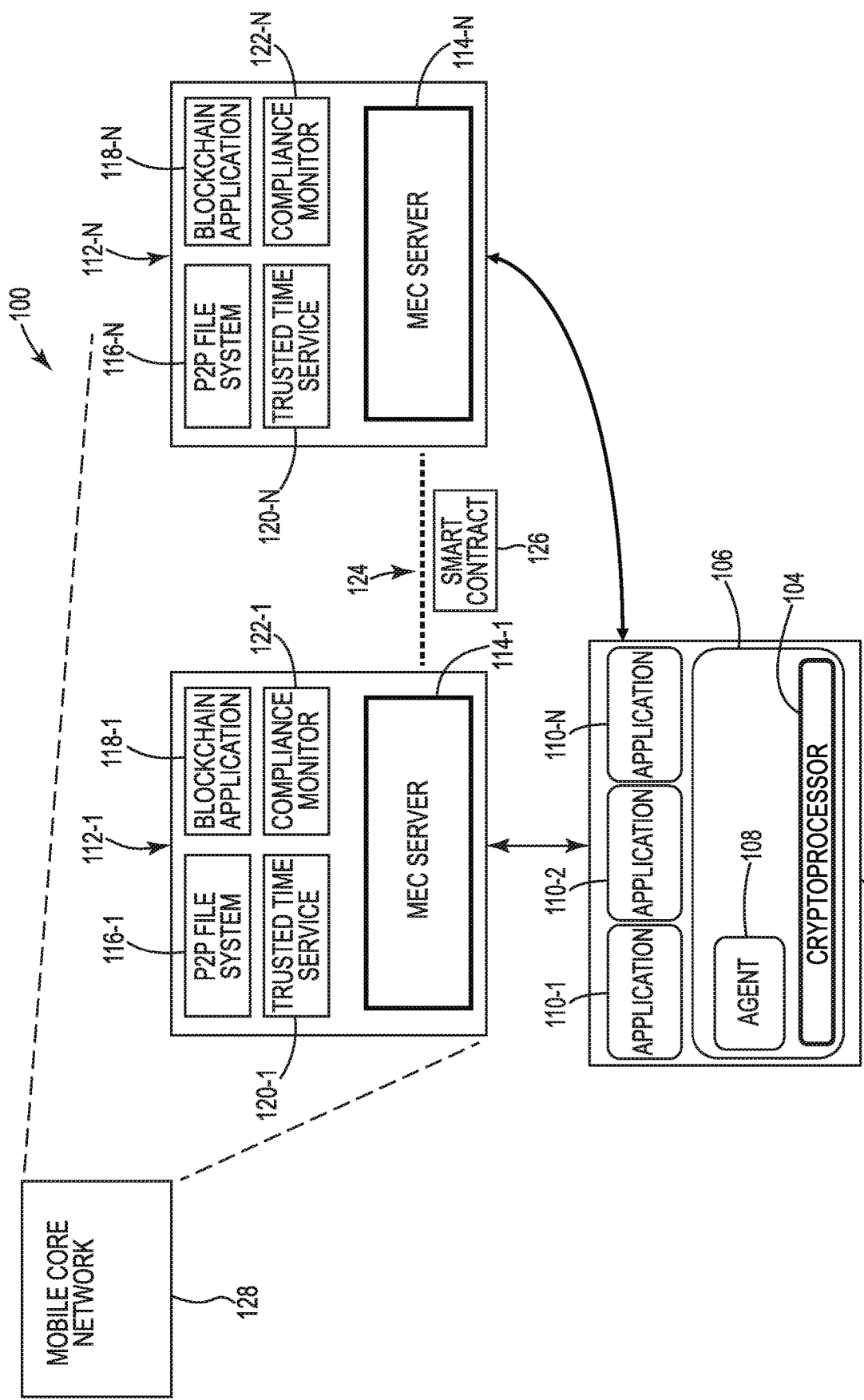
FIG. 1 illustrates an example of a system including a virtualized computing instance for facilitating secure compliance protocols consistent with the disclosure.

Secure compliance protocols may refer to a way to securely provide a proof of compliance of various metrics of a device (e.g., safety-related metrics, electrical control units (ECU) metrics, etc. of a vehicle) to a requesting entity that requests the proof of compliance (e.g., the proof that the device is compliant with a set of provisions specifying a condition, such as legal regulations and compliance provisions). Event triggers may define particular metrics of the device to be included in the proof of compliance.

As used herein, a "device" refers to an entity that is asked and/or needs to be compliant with a provision specifying a condition such as legal regulations and compliance provisions. A device may include a computing system. A device may include one or more memory resources to store data and/or instructions corresponding with the computing system. A computing system may include one or more processing resources to execute instruction such as instruction corresponding to an operating system (e.g., Linus, Unix, Windows, etc.) to provide common services for applications running on the computing system.

A computing system may include a Virtual Computing Instance (VCI) deployed on a hypervisor in a virtualized architecture, or a computing system may include a non-virtualized architecture system. A computing system may include a cryptoprocessor (e.g., on-board cryptoprocessor on a connected vehicle). Computing systems such as personal computers, laptops, tablets, phablets, smartphones, Internet-of-Things (IoT) enabled devices, etc., may be included on a virtualized architecture and/or a non-virtualized architecture. As used herein, "IoT enabled devices" include devices embedded with electronics, software, sensors, actuators, and/or network connectivity which enable such devices to connect to a network and/or exchange data. Examples of IoT enabled devices include vehicles, home appliances, smart home devices, monitoring devices, wearable devices, devices enabling intelligent shopping systems, among other cyber-physical systems.

Growing concerns about the safety and security of IoT enabled devices have created a dynamically evolving and fastly changing legal, regulatory, and compliance landscape. Furthermore, an IoT enabled device may include multiple components (e.g., multiple electrical control units (ECUs) on a vehicle) that need to be compliant with a set of provisions, which means that the device has to provide a significant number of compliance proofs. Furthermore, an IoT enabled device such as a connected vehicle (e.g., a vehicle that has a computing capability to communicate with an external server) may have multiple functional aspects for which the connected vehicle needs to provide multiple different compliance proofs.

Therefore, scalability of secure compliance protocols that can be applied to dynamically changing compliance provisions, various device components, and/or various functional aspects may be desirable. The term "scalability" as used herein, refers to the ability of a secure compliance protocol to dynamically scale to provide compliance proofs for dynamically changing and expanding environments and contexts.

In the context of automotive and aircraft industries, scalability of secure compliance protocols may be sought in various situations as described in the following examples. A vehicle may include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods, Some example legal provisions for connected vehicles and/or autonomous vehicles may include a provision specifying a particular condition (e.g., a provision requiring the presence of a human driver in the vehicle, a provision requiring the most up-to-date software be deployed on the vehicle, a provision pertaining to at least one hand remaining on the steering wheel of the vehicle, a provision requiring multiple electrical control units (ECU)s on the vehicle, etc.).

In one example of the foregoing context of automotive and aircraft industries, various geographical locations may have different laws, which may lead to difficulties in the practical deployment of secure compliance protocols. In this example, The United States may have inconsistent state regulations which pose a challenge to the compliance landscape, where 50 states may have 50 different regulations for vehicles. The driver of a vehicle may wish to travel across various State borders, where one State may have different regulations and/or compliance protocol provisions from another State. The deployment of secure compliance protocols utilizing smart contracts updated by various entities (e.g., law and/or regulatory entities) may provide a practical solution to this fastly changing legal and regulatory landscape.

In another example of the foregoing context of automotive and aircraft industries, a given provision may include securely proving a compliance of multiple electrical control units (ECU)s on a connected vehicle. The provision requiring the presence of a human driver in the vehicle may involve multiple ECU(s) (e.g., pressure sensor, a visual indicator, a weight sensor, etc.) to prove a state of compliance with that provision. In this example, multiple proofs may be needed for each measurement of the ECU(s).

In another example of the foregoing context of automotive and aircraft industries, example functional aspects relating to a connected vehicle may include perception, (e.g., perception responsible for sensor data collection), environment and context (e.g., speed selection in response to terrain conditions), decision and control (e.g., controlling vehicle motion with respect to a perceived external environment), and vehicle platform manipulation (e.g., actuation of the vehicle to achieve the desired motion of the vehicle). In this example, the connected vehicle may need to provide multiple different compliance proofs for all of these functional aspects.

In trying to ensure the scalability of secure compliance protocols, it is technically challenging to automatically generate and communicate a significant number of proofs of compliance that are needed for dynamically evolving and fastly changing legal, regulatory, and compliance landscapes of the IoT enabled devices, as described in the above examples.

In solving these technical challenges, some examples as disclosed herein may utilize an on-board cryptoprocessor to communicate with an agent to generate a proof of compliance on-demand or in response to an event trigger. The device having the cryptoprocessor may securely communicate the compliance proof from the cryptoprocessor to a Mobile Edge Computing (MEC) server at a particular time. The MEC server (e.g., a node on a network such as a wireless network and/or a cellular tower) that corresponds to the cryptoprocessor may participate in a compliance blockchain to store the compliance proof as an immutable record. The proof of compliance may include a content proof of a particular metric that may be time stamped by the MEC server at the particular time of communication (e.g., the immutable record is associated with a particular time stamp).

The compliance blockchain may be utilized by smart contracts created by various entities and executed by the MEC server to prove a compliance of various provisions required by the smart contracts. As used herein, the term "smart contract" is a protocol intended to digitally facilitate, verify, and/or enforce a negotiation and/or a performance of information in credible transactions. A smart contract script (e.g., a command executed by a program) may be executed based on event triggers. The smart contract(s) may be generated by an entity (e.g., a manufacturer, and/or a legal entity). Various entities (e.g., entities that request the proof of compliance such as legal and/or regulatory entities) may create, modify, delete or otherwise update provisions (e.g., specifying a condition such as legal regulations and compliance provisions) using at least one smart contract. Therefore, by leveraging the smart contract capability, the immutable record of the compliance proof provided by a particular device can be digitally verified against such dynamically changing provisions as they are created, modified, deleted or otherwise updated.

The compliance blockchain may store an immutable compliance record, which may include the result of the compliance check of the smart contract(s). The compliance blockchain may provide the result of the compliance check to assist in and scale the attestation of hundreds of components, applications, and/or functional aspects associated with a connected vehicle at a particular time. In this same manner, the MEC server can execute a compliance monitor service to update the compliance blockchain as new and/or additional compliance proof records are generated. In this manner, an immutable historical proof of compliance is generated, providing security benefits for on-vehicle systems (e.g., preventing anti-replay style attacks).

The figures herein follow a numbering convention in which the first digit corresponds to the drawing figure number and the remaining digits identify an element or component in the drawing. For example, reference numeral 100 may refer to element "00" in FIG. 1 and an analogous element may be identified by reference numeral 200 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

Additionally, as illustrated in FIG. 1 (and the other figures described herein), some elements may be illustrated having one, two, three, etc. elements (e.g., the plurality of applications 110-1, . . . , 110-N), it should be understood that system 100 may include more or less than the number of elements illustrated in FIG. 1. For example, the plurality of applications 110-1, . . . , 110-N are illustrated as including three elements; however, it should be understood that there may be more or less than three elements, and the illustrations are intended to illustrate the examples of the disclosure and should not be taken in a limiting sense. Some elements of FIG. 1 (and the other figures described herein), may be illustrated as a having a single element (e.g., an agent 108), and it should be understood there may be more or less than one and that illustrations are intended to illustrate examples of the disclosure, and should not be taken in a limiting sense.

FIG. 1 illustrates an example of a system 100 including a virtualized computing instance for facilitating secure compliance protocols consistent with the disclosure. The system 100 may include a virtual computing instance (VCI) 102, a cryptoprocessor 104, a hypervisor 106, an agent 108, a plurality of applications 110-1, . . . , 110-N, a plurality of nodes 112-1, . . . , 112-N, a plurality of Mobile Edge Computing (MEC) servers 114-1, . . . , 114-N, a plurality of Peer-to-Peer (P2P) file systems 116-1, . . . , 116-N, a plurality of blockchain applications 118-1, . . . , 118-N, a plurality of trusted time services 120-1, . . . , 120-N, a plurality of compliance monitors 122-1, . . . , 122-N, at least one compliance audit 124, at least one smart contract 126, and/or at least one mobile core network 128. In some examples, the VCI 102 may be deployed on the hypervisor 106 and provisioned with a plurality of hardware computing resources.

As illustrated in FIG. 1, the system 100 may include the VCI 102 which may be included in a device (e.g., a connected vehicle), and the VCI 102 may include the cryptoprocessor 104, which may be deployed on the hypervisor 106. The VCI 102 may further include the agent 108, which may be deployed on the hypervisor 106. The VCI 102 may further include the plurality of applications 110-1, . . . , 110-N. In some examples, the VCI 102 may enable a secure communication of compliance protocols between the device (e.g., a connected vehicle) and at least one of the plurality of MEC servers 114-1, . . . , 114-N.

As illustrated in FIG. 1, the system 100 may include the plurality of MEC servers 114-1, . . . , 114-N. Each of the plurality of MEC servers 114-1, . . . , 114-N may include at least one of the plurality of Peer-to-Peer (P2P) file systems 116-1, . . . 116-N, at least one of the plurality of blockchain applications 118-1, . . . , 118-N, at least one of the plurality of trusted time service 120-1, . . . , 120-N, and/or at least one of the plurality of compliance monitor 122-1, . . . , 122-N. At least one of the plurality of MEC servers 114-1, . . . , 114-N may correspond to a particular node of the plurality of nodes 112-1, . . . , 112-N, and the plurality of nodes 112-1, ..., 112-N may be included in the mobile core network 128. As illustrated in FIG. 1, the compliance audit 124, and/or the smart contract 126 may correspond to at least one of the plurality of MEC servers 114-1, ..., 114-N. For example, a smart contract may be generated by an entity to digitally verify information provided by a device and confirm a compliance with provisions required by the entity. In this example, the smart contract script may exist on at least one of the plurality of MEC servers to be executed based on an event trigger.

In some examples, as illustrated in FIG. 1, the VCI 102 may be included on a device such as a connected vehicle, and the cryptoprocessor 104 may be deployed on the hypervisor 106 and may include instructions to execute the applications 110-1, ..., 110-N. As used herein, the term "Virtual Computing Instance" (VCI) means a virtual machine which may be an emulation of a computer system to provide the functionality of a physical computer. The VCI implementation (e.g., virtual architecture) may involve specialized hardware, software, and/or a combination of hardware and software, and may provide full virtualization, hardware-assisted virtualization, operating-system virtualization, and/or a variation thereof.

As illustrated in FIG. 1, the VCI 102 may include one or more memory resources (and/or possess the ability to perform memory-like functions) to store instructions. The memory resource(s) may be electronic, magnetic, optical, virtual, and/or other physical storage devices that store executable instructions; for example, volatile memory (e.g., RAM, DRAM, SRAM, EPROM, EEPROM, etc.) and/or non-volatile memory (e.g., a HDD, a storage volume, data storage, etc.). In addition, the VCI 102 may include a processor (and/or possess the ability to execute processor-like functions). For example, the VCI 102 may include a processor which may be a central processing unit (CPU), a semiconductor-based microprocessor, and/or other hardware devices suitable for retrieval and execution of instructions stored in a memory resource (e.g., in a non-transitory computer readable medium). The example processor may fetch, decode, and execute instructions. As an alternative, or in addition to, retrieving and executing instructions, the example processor may include at least one electronic circuit that may include electronic components for performing the functionality of executed instructions.

In some examples, the hypervisor 106 may monitor the VCI 102. As used herein, the term "hypervisor" means a virtual machine monitor, including computer software, firmware, hardware, and/or combinations thereof, that may create, operate, and/or execute the operations of VCIs.

As used herein, the term "application" means an instruction that is designed to execute a function on an electronic and/or mechanical device (e.g., an IoT enabled device such as a connected vehicle). In some examples, an application may be designed to execute a desired function on a number of devices. Some devices may be equipped with one or more electronic control unit(s) (ECU)s, and the operation of the ECU(s) may be executed by a corresponding application (e.g., application 110-N). As used herein, the term "electronic control unit" (ECU) means any embedded system that controls one or more operation(s) of an electronic and/or mechanical device. For example, one or more ECU(s) may be included on a vehicle to execute or otherwise control physical operations on a vehicle (e.g., powertrain control module, speed control unit, brake control module, battery management system, etc.).

As used herein, the term "compliance proof" and variations thereof (e.g., proof of compliance) means a showing of evidence that a particular metric of a particular operation (e.g., device operation of an ECU) is in accordance with provisions provided by an entity. In some examples, the entity may be a user setting a specific provision (e.g., a desired temperature) for the operation of the ECU(s) of a particular device. In other examples, the entity may be a government entity making and/or enforcing laws and regulations including safety regulations, privacy regulations (e.g., a proof of privacy), and/or other local, state, federal laws and regulations. For example, local laws and regulations may provide provisions specifying regulations for compliant operations of a connected vehicle. Alternatively, a connected vehicle may be deemed non-compliant, and an operation of the non-compliant vehicle may result in disciplinary actions (e.g., a fine).

Continuing with the previous example, the connected vehicle may produce a compliance proof proactively (e.g., based on a device-initiated event trigger), or on-demand (e.g., based on an event trigger initiated by an entity external to the device such as a warranty change, a stakeholder's request, etc.), to prove that a particular operation (e.g., operation of headlights) is within the specifications provided by the entity (e.g., a government entity). Similarly, as used herein, the term "compliance state" and/or "state of compliance" means a status regarding a proof of compliance for a device (e.g., a connected vehicle). For example, a connected vehicle may provide a compliance state (e.g., a state of being compliant or non-compliant) based on a verification of compliance proofs generated in response to the provisions specified by various entities. In some examples, the state of compliance and the proof of compliance may result in the execution of a smart contract 126. For example, a connected vehicle may proactively produce a compliance proof related to the particular operation of a device to confirm that the operation is within the specifications provisioned by an entity. In this example, the compliance proof may be received by at least one of the plurality of MEC servers 114-1, ..., 114-N and a smart contract script may be executed by the MEC server 114-1 in response to the received compliance proof.

In some examples, as illustrated in FIG. 1, the agent 108 may interact with the cryptoprocessor 104 and may generate a plurality of compliance proofs. In some examples, the cryptoprocessor 104 may provide cryptoprocessing to securely communicate with at least one of a plurality of nodes 112-1, ..., 112-N. For example, the cryptoprocessor 104 may enable trusted integrity measurements (e.g., compliance proofs). As used herein, the term "trusted integrity measurement" means a cryptographic hash of a given software entity (e.g., firmware), and the trusted integrity measurement may be stored in registers called Platform Configuration Registers (PCR)s. In this example, the cryptoprocessor 104 may be a Trusted Platform Module (TPM) that can be used to produce proofs of compliance regarding various metrics such as safety-related metrics, ECU metrics, etc. of a vehicle in which the TPM is deployed. A TPM may be operational on both virtualized and non-virtualized environments and may enable trusted integrity measurements.

Figure 3:
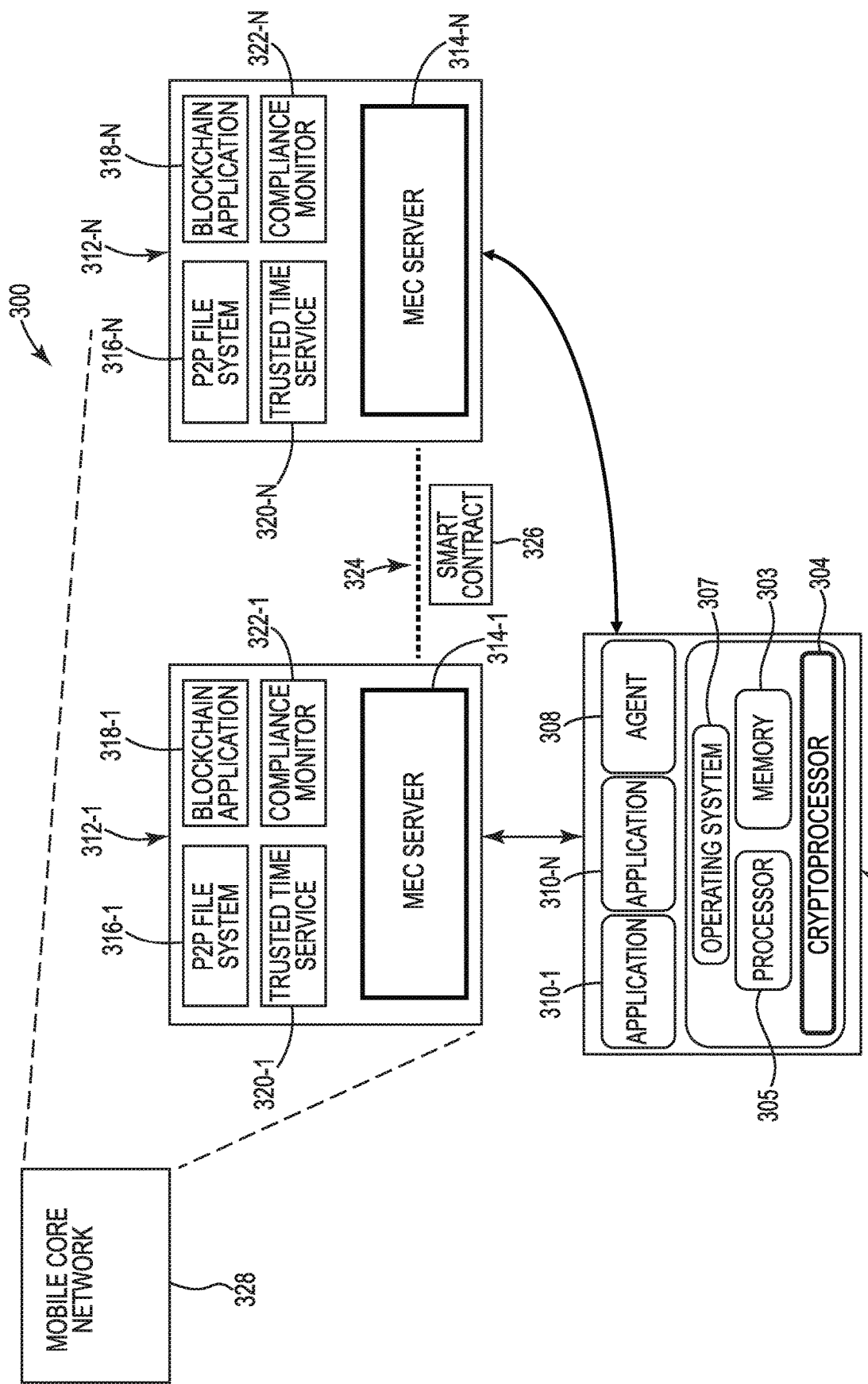
FIG. 3 illustrates an example of a system including a processor for facilitating secure compliance protocols consistent with the disclosure.

As described in more detail in conjunction with FIG. 3, the cryptoprocessor 104 may provide a functionality for remote attestation. As used herein, the term "remote attestation" generally refers to a capability of the TPM (e.g., the cryptoprocessor), which allows a third-party to verify that the hardware and/or software on a host has not been changed or tampered with. The remote attestation can be supported with the help of a quote operation.

In some examples, the cryptoprocessor 104 may provide to a third-party application a compliance proof that a device platform is in a defined integrity state. As used herein, the term "defined integrity state" refers to a condition and/or a status of a device in relation to requirements that may be imposed on the device. For example, functionality standards (e.g., laws) may include language specifying conditions for a device such as a connected vehicle to be in a state of compliance (e.g., a requirement to use headlights at night), the cryptoprocessor 104 may provide a trusted integrity measurement (e.g., a cryptographic hash of the content proof) to prove that the headlights are in a defined integrity state, further, the cryptoprocessor 104 may provide the trusted integrity measurement during a remote attestation by a third-party.

For example, the plurality of applications 110-1, . . . , 110-N may provide data and/or information corresponding to the operation of the respective ECU(s), to a plurality of agents 108. The agent(s) 108 may generate a content proof based on the data/information. As used herein, the term "content proof" refers to information and/or data relating to the state of a device. In some examples, a content proof may be data from an ECU of a connected vehicle, and/or data related to sensor information. The content proof may be generated (e.g. hashed) by the agent(s) 108 and may be time stamped (e.g., signed) by at least one of the plurality of trusted time service 120-1, . . . 120-N included with at least one of the plurality of MEC servers 114-1, . . . 114-N. In this example, the time stamped content proof can be returned to the agent(s) 108 and utilized to demonstrate a state of compliance when a compliance proof is generated between the agent(s) 108 and the cryptoprocessor 104 and provided to at least one of the plurality of MEC servers. As discussed in greater detail herein, the content proof of a connected vehicle may include a Vehicle State Record (VSR) file, an Application State Record (ASR) file, and/or a Global State Record (GSR) file generated by the agent 108. In some examples, the virtual architecture (e.g. a VCI) of a connected vehicle, may include two subtypes of VSR files: the ASR file, and/or the GSR file. The VSR file(s) and subtypes may be aggregated. As illustrated in FIG. 1, the agent(s) 108 may interact with the cryptoprocessor 104 to produce a content proof that may include data and/or information related to the operation of a particular ECU. As used herein, the term "agent" means a computer program to act on the behalf of a user and/or another representative of authority whose purpose may be to decide if an action is appropriate. Agents may be autonomous or work together with other agents or entities. In some examples, an agent may include instructions that respond to a request for information about an operation. In other examples, the agent may be a proof agent (e.g., a vehicle proof agent). In some examples, a proof of compliance may be requested in response to an event trigger.

For example, as illustrated by FIG. 1, the plurality of nodes 112-1, . . . , 112-N may be included within at least one mobile core network 128, and each of the plurality of nodes 112-1, . . . , 112-N may include at least one of a plurality of Mobile Edge Computing (MEC) servers 114-1, . . . , 114-N. As used herein, something that is "included within at least one mobile core network" is something that is within a domain that is under the control of the mobile core network. For example, each server of the plurality of MEC servers 114-1, . . . , 114-N may correspond to each node of the plurality of nodes 112-1, . . . , 112-N to securely communicate with the cryptoprocessor 104, and may generate a time stamp (e.g., that may be provided by the trusted time service 120-1) corresponding to at least one content proof (e.g., of the compliance protocol). In some examples, the plurality of nodes 112-1, . . . , 112-N may include at least one of the plurality of compliance monitors 122-1, . . . , 122-N that may gather and/or collect compliance proofs from a device in response to an event (e.g., an event trigger). For example, an event trigger may require a compliance of a particular parameter of an ECU deployed on the device and may outline provisions for the particular ECU to prove that the device is compliant.

As used herein, the term "event trigger" is an occasion when a device may be compelled to provide data and/or information to an entity to prove a compliance to a particular condition, requirement, provision, and the like. For example, a collection of compliance proofs may be triggered by an event trigger including a device-initiated event trigger (e.g., a start, stop, or initiation of an operation of the device, a device connecting to a MEC server 114-1, an upgrade or any updates to hardware and/or software of the device, a repair and/or replacement of an ECU or ECU component, a device transitioning from a first geographical area to a second geographical area), an inclusion and/or modification of a specification related to the manufacturer and/or a warranty of a device, etc., a stakeholder-initiated event trigger (e.g., a stakeholder requests the collection of compliance proofs). As used herein, the term "stakeholder" means a user or another entity that may have an interest and/or concern in a state of a device and/or its metrics (e.g., a passenger of a connected vehicle).

As used herein, the term "metric" means an output of a particular ECU related to a device (e.g., a IoT enabled device). A metric may also refer to qualitative data relating to a device. For example, a metric may be a measurement of size (e.g., the dimension of a wheel well, a length, width, height, etc.), a speed, a temperature, a degradation factor, an age, a geographical location, etc. In other examples, a metric may be a provision specifying a condition for the compliant operation of a particular metric of an ECU. Additionally, or in the alternative, a metric may define one output/input, several outputs/inputs, or a combination of several different outputs/inputs in various combination.

As used herein, the term "state" in the context of a device and/or a device's compliance to an entity's required metrics means a determination of a particular metric and/or a particular set of metrics at a specific point in time (e.g., an amount of fuel in a vehicle). The details of compliance proof generation in response to various event triggers are discussed in detail in conjunction with FIGS. 4A and 4B.

The plurality of nodes 112-1, . . . , 112-N may be positioned to be in communication with a mobile core network 128 (e.g., the plurality of nodes 112-1, . . . , 112-N may be positioned within the mobile core network 128), and each node 112-1, . . . , 112-N may include at least one of the plurality of MEC servers 114-1, . . . , 114-N. As illustrated in FIG. 1, each of the plurality of nodes 112-1, . . . , 112-N may include at least one of compliance monitor 122-1, . . . , 122-N, at least one Peer-to-Peer (P2P) file system 116-1, . . . 116-N, at least one trusted time service 120-1, . . . , 120-N, and/or at least one blockchain application 118-1, . . . , 118-N. In some examples, the VCI 102 of a device, a MEC server 114-1, . . . , 114-N, and/or a mobile core network 128 may participate in a permissioned blockchain (e.g., a compliance blockchain) to execute at least one smart contract 126. The smart contract(s) may be included as a part of every MEC server participating in the compliance blockchain. For example, a smart contract 126 may provide a credible transaction of information during a compliance audit 124 such that the credible transaction may be used between at least two of a plurality of nodes 112-1, . . . , 112-N to provide a state of compliance in response to an event trigger.

In some examples described herein, a compliance blockchain may execute more than one type of smart contract. One type of smart contract is an audit smart contract. As used herein, the term "audit smart contract" may refer to a smart contract that may be structured by a local Department of Motor Vehicle (DMV) authority, vehicle manufacturer, etc., and the audit smart contract may compare a compliance state of a connected vehicle to local law and safety standards. For example, the audit smart contract may retrieve input compliance proof data from at least one of the plurality of compliance monitors 122-1, . . . , 122-N, and/or may store the result of a compliance check and/or hash of a content proof to the compliance blockchain. The audit smart contract may include values of PCRs for vehicle information and acceptable sensor values according to local laws. Another example of a smart contract, may be a state check smart contract. As used herein, "state check smart contract" refers to a smart contract that may be triggered by a third-party application (e.g., a stakeholder) and it may check a compliance and/or integrity state on the compliance blockchain. For example, a stakeholder may be an occupant of a connected vehicle, and the stakeholder may trigger the execution of a state check smart contract to check and/or verify a state of compliance of the connected vehicle.

As used herein, the term "permissioned blockchain" means a blockchain network that may have an ability to restrict and/or allow contributors (e.g., devices, users, applications, etc.) to participate in validation of information (e.g., compliance proof information) and/or to participate in a consensus mechanism of the permissioned blockchain. As used herein, the term "blockchain" means a continuously growing list of immutable records (e.g., a compliance proof), which may be called "blocks" and may be linked and secured by cryptoprocessing (e.g., the cryptoprocessor 104). As used herein, the term "compliance blockchain" may refer to a permissioned blockchain and may refer to a platform utilized for storing immutable compliance proof records and/or executing smart contracts (e.g., the plurality of smart contracts 126). For example, securely generated blocks may include compliance proofs corresponding to various metrics of a device, and a compliance blockchain may restrict and/or allow validation of the compliance proofs.

In some examples, a permissioned blockchain may be able to restrict and/or allow creation of smart contracts (e.g., the plurality of smart contracts 126 generated by an entity). For example, the MEC server 114-1 may control which of the plurality of nodes 112-1, . . . , 112-N may participate in a consensus and/or may control read/write permissions to the permissioned blockchain.

While the example discussed in conjunction with FIG. 1 illustrates an example of a virtual environment (e.g., VCI 102), it should be understood that one or more compliance proofs may be produced for a permissioned blockchain in the manner described in conjunction with FIG. 1 for non-virtualized environments, as is further discussed herein in conjunction with FIG. 3.

In some examples, the cryptoprocessor 104 may securely provide data, information, and/or measurements (e.g., a content proof) at a particular instance in time to at least one of the plurality of MEC server 114-1, . . . , 114-N for use as an immutable record in a compliance blockchain (e.g., a permissioned blockchain). The cryptoprocessor 104 may execute instructions for the agent 108 to securely provide, at the particular instance in time, a content proof (e.g., the content proof generated based on the data and/or information from at least one of the plurality of applications 110-1, . . . , 110-N) to the MEC server 114-1. Continuing with the previous example, the MEC server 114-1 may execute the trusted time service 120-1 to associate the content proof with the particular instance in time (e.g., a time stamp), and the time stamped content proof (e.g., a signed content proof) may then be securely communicated back to the agent 108. The agent 108 may send a quote request for the time stamped content proof to the cryptoprocessor 104, which may create the quote. As used herein, the term "quote" may refer to a cryptographic hash provided by the cryptoprocessor 104, and the quote may include information such as a signed VSR file (e.g., the time stamped content proof), and the agent 108 may receive the quote from the cryptoprocessor 104 and may generate the compliance proof. For example, the compliance monitor 122-1 may send a request for a compliance proof (e.g., the headlight operation metric) to the agent 108 in response to a determined event trigger (e.g., the sun went down), the agent 108 may send a generated compliance proof (e.g., proof of the headlight operating at a particular time), to the compliance monitor 122-1.

At least one of the plurality of trusted time services 120-1, . . . , 120-N may be based on the Internet Engineering Task Force-Request For Comment (IETF-RFC) 3161. The cryptoprocessing (e.g., by the cryptoprocessor 104) may be based time root of trust and/or verified time mechanisms. As illustrated in FIG. 1, the MEC server 114-N may correspond to the node 112-N and the MEC server 114-N may utilize Precision Time Protocols (PTP) as defined by IEEE 1588-2002 standard for accurately synchronizing a time stamp, and at least one of the plurality of trusted time services 120-1, . . . , 120-N may utilize the PTP time stamp and/or a signing mechanism as described in IETF-RFC 3161 to verify a content proof at a particular instance in time.

Continuing with the previous example, the compliance proof may interact with the blockchain application 118-1. The blockchain application 118-1 may participate in the execution of the smart contract 126. The smart contract 126 may further include the compliance proof and may be audited by the compliance audit 124 to check the result (e.g., compliant or non-compliant) of the compliance proof. Then, the compliance proof and/or the audit result thereof, may be stored in the P2P file system 116-1.

Additionally, the result of the compliance audit 124 and/or the compliance proof, may be stored as a block (e.g., a digest) in the compliance blockchain. Continuing with the previous example, a third-party and/or a stakeholder may send a request (e.g., a remote attestation) to the P2P 116-1 file system requesting a proof of compliance (e.g., proof of headlight operation at a particular time), and the P2P file system 116-1 may send a response that includes the requested information (e.g., the proof of compliance). In this example, the third-party may retrieve a previously generated compliance proof, pertaining to a particular metric, at a particular time. Continuing with the previous example, when the smart contract 126 is a state check smart contract, it may be checked by a third-party application/interested entity (e.g., a stakeholder) to provide (e.g., confirm) the compliance proof record.

In some examples illustrated in FIG. 1, at least one of the plurality of compliance monitors 122-1, . . . , 122-N may trigger a compliance proof collection from a device (e.g., a connected vehicle) as described in the examples above. In some examples, as illustrated in FIG. 1, at least one compliance monitor 122-1 may store the collected compliance proofs in a Peer-to-Peer (P2P) file system 116-1 for future auditability and construction of a compliance blockchain. In some examples, the plurality of P2P file systems 116-1, . . . , 116-N may store plain text proof data, and/or actual proof data (e.g., BITTORRENT™, IPFS).

For example, a compliance blockchain may be constructed from blocks, and each block may include a timestamped and encrypted content proof (e.g., generated as a compliance proof) which may be stored in at least one P2P file system 116-1. Additionally, the compliance blockchain may store an immutable compliance proof record and may act as a data source for multiple third-party applications (e.g., monitoring applications), and/or execute a smart contract 126 (e.g., a Turing complete smart contract) between at least two of the plurality of nodes 112-1, . . . , 112-N included in the mobile core network 128. In some examples, at least one of the plurality of MEC servers 114-1, . . . , 114-N may include at least one of the plurality of blockchain applications 118-1, . . . , 118-N to provide an interface for the compliance blockchain.

For example, as illustrated in FIG. 1, the at least one of the plurality of blockchain applications 118-1, . . . , 118-N may provide a mechanism for the plurality of MEC servers 114-1, . . . , 114-N to participate in the compliance blockchain. For example, the MEC server 114-1 may include the blockchain application 118-1 to provide an interface between a compliance blockchain and a third-party application (e.g., a monitoring application). For example, the blockchain application 118-1 may provide an interface for the MEC server 114-1 to execute the smart contract 126 between the node 112-1 and the node 112-N.

Continuing with the previous example, the blockchain application 118-1 may participate in the consensus and/or verification of compliance proofs stored as described above (e.g., utilizing the P2P file system 116-1) in the compliance blockchain. Additionally, the blockchain application 118-1 may store the blockchain information, for example, permissioned credentials (e.g., to allow access). In some examples, at least one of the plurality of blockchain applications 118-1, . . . , 118-N may include a functionality for permissioned third-party applications to access the compliance blockchain. For example, a law enforcement entity may wish to access and/or view the compliance blockchain to check the compliance relating to a device such as an autonomous vehicle. In the preceding example, the blockchain application 118-1 may be an accessible interface between the compliance blockchain and the law enforcement entity, additionally, the blockchain application 118-1 may check the permission credentials of the entity to allow access.

In some examples, as illustrated in FIG. 1, at least one of the plurality of blockchain applications 118-1, . . . , 118-N may provide an interface for a third-party application (e.g., a monitoring application) to access the compliance blockchain. As used herein, the term "monitoring application" means an application that may request access to view and/or check the compliance blockchain. Some examples of a monitoring application may include mobile applications, applications for monitoring an ECU metric of a device and/or a machine (e.g., a vehicle dashboard), law enforcement monitoring applications, etc. For example, a user may wish to use a monitoring application to confirm that a vehicle (e.g., a device) is compliant with statutes and regulations of a given geographic location. In some examples, the plurality of MEC servers 114-1, . . . , 114-N may execute a compliance audit 124 corresponding to the connected vehicle in response to an event trigger.

In some examples, as illustrated in FIG. 1, the VCI 102 may be included in the components of a connected vehicle. For example, the connected vehicle may have virtualized ECU(s) that control the various connected vehicle components (e.g., brakes and speed). The operation of any particular ECU may be executed by at least one of a plurality of applications 110-1, . . . , 110-N. For example, at a given time and/or in response to an event trigger, a compliance audit 124 may request a metric of a particular ECU corresponding to the application 110-1 of a connected vehicle to demonstrate a proof of compliance. Continuing with the previous example, the agent 108 may interact with the cryptoprocessor 104 to produce content proofs of the particular ECU metrics, which may then be securely provided to the MEC server 114-1 for time stamp verification. The agent 108 will construct a compliance proof in a manner consistent with the examples described above. Continuing with the preceding example, the agent 108 may produce a content proof that may be a Vehicle State Record (VSR) file to demonstrate compliance to a required metric (e.g., the particular metric of the ECU).

As mentioned above, in some examples, a virtual and/or a non-virtual vehicle architecture may use content proofs called VSR file(s). The VSR file(s) may contain information about a current vehicular hardware and/or information metric. For example, some of the metrics the VSR file(s) may contain are a condition, a fitness, an age, a result of an ECU reading, and/or relevant sensor readings (e.g., position of an operator's hand on a steering wheel etc.) to prove a compliance (e.g., a legal and/or warranty compliance). It should be noted that the VSR(s) file information as discussed herein may be aggregate. In some examples, the non-virtual vehicle architecture may be included in an autonomous vehicle and the metrics may apply to a level of autonomy (e.g., full or partial autonomy at a given time). The non-virtual architecture VSR file(s) content proofs are discussed herein in conjunction with FIG. 3.

As illustrated in FIG. 1, by system 100, an example of a virtual architecture of a device is described including the VCI 102. In some examples, the device may include a connected vehicle, and an agent 108 may produce the content proof(s) of the VSR file(s) to demonstrate an integrity of the content (e.g., the connected vehicle ECU(s)). The VSR file(s) and the proof of compliance corresponding to the VSR files(s) may be generated periodically (e.g., scheduled), on-demand (e.g., by a third-party application), and/or in response to an event trigger (e.g., repair to an ECU(s)).

For example, the system 100 as illustrated in FIG. 1 may include the VCI 102 that may be included in a device such as a connected vehicle and may include an agent 108 to generate an ASR file(s). As mentioned above, an ASR file is a subtype of a VSR file. Continuing with the preceding example, the plurality of applications 110-1, . . . , 110-N may each correspond to an ECU, and each may generate the ASR file. Each ASR file may include information such as, application configuration attributes (e.g., the application 110-N name and/or version), security attributes (e.g., signature check result), and/or load attributes (e.g., percentage of CPU, memory, used by the application). For example, the agent 108 may generate a particular ASR file corresponding to a particular application 110-1 to prove a state of compliance of the corresponding particular ECU. The second subtype of the VSR file is the GSR file, which may be similarly generated by the agent 108.

For example, the system 100 illustrated in FIG. 1, may include the VCI 102 that may be included in a device such as a connected vehicle, and the VCI 102 may include an agent 108 to generate the GSR file(s). In some examples, the GSR file(s) may be a variety of metrics corresponding to the status of the connected vehicle. For example, the agent 108 may generate GSR file(s) such as, driver compliance sensor information (e.g., an identity and/or physiological data), a connected vehicle firewall alert (e.g., data security), a Global Positioning System data (e.g., a geographical location), a level of autonomy (e.g., full or partial vehicle autonomy at a particular instance in time), a detection of violation (e.g., a detection of traffic violation), and/or other static vehicle details (e.g., size and/or manufacture of tires). For example, the agent 108 may generate GSR file(s) to provide content proof(s) relating to a reduced speed of the connected vehicle when transitioning from a highway to a school zone (e.g., from a particular high-speed area to a particular low-speed area). In some examples, the agent 108 may trigger a 'push' to initiate a compliance protocol to the plurality of MEC servers 114-1, . . . , 114-N.

For example, the device as discussed in this example is a connected vehicle, the agent 108 may trigger a push of a compliance protocol (e.g., and/or a generation of a content proof) in response to an event trigger. As used herein, the term "push", in the context of a secure compliance protocol and/or a proof generation, means a communication of data and/or information is initiated by the entity generating the information (e.g., the VCI 102 of the connected vehicle and/or the agent 108). In contrast, the term "pull" as used herein, in the context of secure compliance protocols and/or proof generation, means the request for information (e.g., a compliance proof) is initiated by the receiver (e.g., the MEC server 114-1, and/or the compliance monitor 122-1). In some examples, a push of compliance proof may trigger the execution by the plurality of MEC servers 114-1, . . . , 114-N, of a smart contract 126 with the new compliance proof information that may result from the push.

In some examples, a push of a compliance protocol may correlate to a proactive event trigger (e.g., a client event trigger). Continuing with the example above, where the device is a connected vehicle, the agent 108, may proactively initiate an event trigger (e.g., a push). In some examples, the push of a compliance protocol may be a regular and/or routine occurrence (e.g., starting the connected vehicle), the connected vehicle may enter or exit a geographical boundary (e.g., a geographical transition from one State to another State).

In other examples, a device such as a connected vehicle may upgrade and/or downgrade hardware, and/or a compliance proof may be pushed, on-demand, by a stakeholder. In some examples, the VSR file(s) (and/or ASR, GSR file(s)) generated by the agent 108, may be a data input for the plurality of trusted time service 120-1, . . . , 120-N (e.g., in accordance with IETF-RFC 3161), and included in the construction of a secure compliance blockchain. In some examples, a data input for the plurality of trusted time service 120-1, . . . , 120-N may include a hello message and/or a nonce. In some examples, the nonce may be a cryptographic nonce, which may be a random or pseudo-random value that is generated for one-time use by at least one of the plurality of trusted time services 120-1, . . . , 120-N.

In some examples, as illustrated in FIG. 1, a compliance audit 124 may include the audit (e.g., an inspection and/or an assessment) of a smart contract 126. In the preceding example, the system 100 may include a connected vehicle, which may include the VCI 102 and all of the components corresponding to the VCI 102 (e.g., the agent 108, etc.). In the preceding example, the agent 108 may generate a content proof (e.g., a VSR, a GSR and/or an ASR file) and the cryptoprocessor 104 may execute instructions for the agent 108 to calculate a hash of the content proof. Continuing with the preceding example, the hashed content proof may be a data input to be included in a trusted time service 120-1 included on the MEC server 114-1.

Continuing with the previous example, the trusted time service 120-1 may generate a digital signature of the hash and tie it to a time stamp, and the digital signature may be formatted as an encrypted digital signature (e.g., a PKCS 7 digital signature). Further, the hash, the encrypted digital signature, and a public-key certificate may be stored together, and/or returned to the requester (e.g., the agent 108 of the connected vehicle). The input included in the trusted time service 120-1 and executed on the MEC server 114-1, may be expressed as a content proof for the purpose of compliance proof construction and the creation of a compliance blockchain record (e.g., a block). The compliance proof construction and the generation of the compliance blockchain record is discussed in detail herein.

The preceding examples explained in conjunction with FIG. 1 describe solving technical challenges relating to secure compliance protocols and the scalability of secure compliance protocols that can be applied to dynamically changing compliance provisions, various device components, and/or various functional aspects may be desirable.

Figure 2:
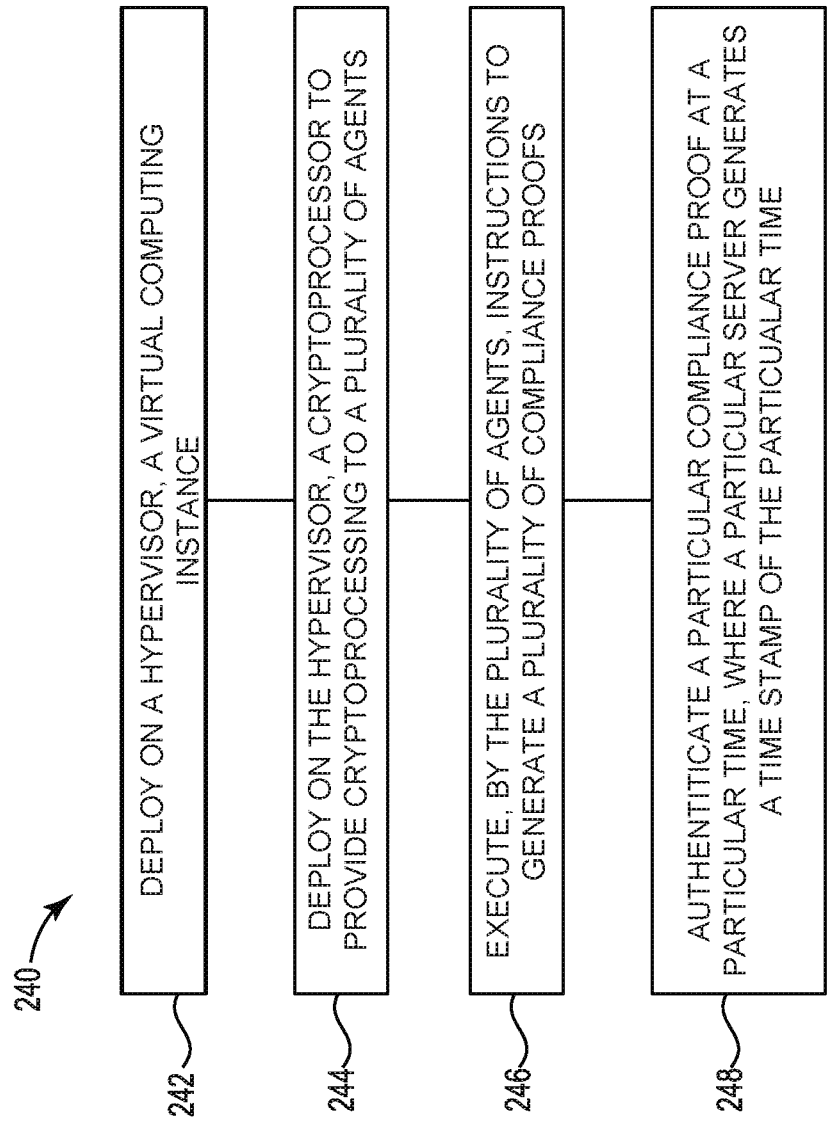
FIG. 2 illustrates an example flow diagram for a secure compliance protocol with a virtualized computing instance consistent with the disclosure.

FIG. 2 illustrates an example flow diagram 240 for a secure compliance protocol with a virtualized computing instance consistent with the disclosure. It should be understood that while an example of a virtual architecture is illustrated in FIG. 2 as the flow diagram 240, a non-virtual architecture may be described in a similar manner. The non-virtual architecture is described herein in conjunction with FIG. 3. As illustrated in FIG. 2, at block 242 of the flow diagram 240, a VCI (e.g., the VCI 102), may be deployed on a hypervisor (e.g., the hypervisor 106) of a device (e.g., a connected vehicle) and provisioned with a plurality of hardware computing resources. The connected vehicle may include functionality to execute instructions using a plurality of computing resources (e.g., the applications 110-1, . . . , 110-N, the agent 108) that may be executed on hardware. For example, the VCI may include a cryptoprocessor (e.g., the cryptoprocessor 104), an agent (e.g. agent 108), and a plurality of applications (e.g., applications 110-1, . . . , 110-N) to execute operations of an electronic control unit ECU included on the device and/or provide data and/or information relating to a state of the ECU to the cryptoprocessor and/or the agent.

For example, at block 242 of the flow diagram 240, the VCI may be deployed on the hypervisor deployed on a connected vehicle, and an application of the plurality of applications, may provide information relating to the headlights included on the connected vehicle (e.g., headlights on or off). For example, the application may provide the headlight information (e.g., a metric) to the agent (e.g., agent 108), in response to an event trigger. In some examples, the information provided by the applications will be included as content proofs, and may be included as a proof compliance, and authenticated throughout a secure compliance protocol.

For example, as illustrated by FIG. 2, at block 244 of the flow diagram 240, the cryptoprocessor included on the hypervisor may provide cryptoprocessing to the agent and securely communicate the content proofs provided by the gents to a plurality of servers (e.g., MEC servers 114-N). For example, an application corresponding to a metric (e.g., the headlight operation unit), may provide the appropriate metric (e.g., are the headlights on or off) to the agent. Continuing with the previous example, the cryptoprocessor may execute instructions for the agent to construct a content proof (e.g., an ASR, a VSR, and/or a GSR file(s)), containing the headlight metric supplied by the application. Continuing with the previous example, the agent may execute instructions including providing the content proof to the MEC server for verification (e.g., time stamp signature), and the MEC server may correspond to a node (e.g., the node 112-1). In another example, the agent may execute instructions to proactively push (e.g., a client event trigger) a compliance proof, and the compliance proof may be collected by the compliance monitor for verification by the MEC server.

As illustrated in FIG. 2, at block 246 of the flow diagram 240, the plurality of agents may generate a plurality of compliance proofs. For example, the agent may calculate a hash that may be included as a data input (e.g., the content proof) that may be time stamped by a trusted time service (e.g., the trusted time service 120-1), thus providing the secure (e.g., hashed) ASR file to a MEC server corresponding to the node. The preceding example describes a compliance protocol for communicating the data input (e.g., the content proof) at a particular time. In another example, a proof of compliance may be requested (e.g., remote attestation) by a third party application thereby creating an event trigger (e.g., an infrastructure event trigger), and the event trigger, may prompt a compliance monitor (e.g., at least one of the plurality of compliance monitors 122-1, . . . , 122-N) to confirm a state of compliance (e.g., headlight operation), of a device (e.g., a connected vehicle).

Continuing with the previous example, illustrated in FIG. 2 of the flow diagram 240, at block 248, describes authenticating the compliance proof at the time corresponding to the generation of the content proof (e.g., the encrypted ASR file), where the time stamp of the particular time is generated by the MEC server corresponding to a node. Continuing with the preceding example, the time stamp based on the time the content proof was generated is provided by the trusted time service included on the MEC server, corresponding to the node. Continuing with the previous example, the MEC server may communicate the authenticated content proof to back to the cryptoprocessor deployed on the hypervisor, deployed on the connected vehicle.

In some examples, the trusted time service may utilize P2P protocols as described in conjunction with FIG. 1 and may generate a formatted encrypted digital signature of the hashed data (e.g., the content proof and/or the encrypted ASR file), concentrated to a time stamp, which may be stored together with a public-key certificate. The formatted encrypted digital signature of the hashed data tied to a time stamp may be returned to the agent, and/or may be stored as one of a plurality of immutable compliance proof records (e.g., a block), included in a compliance blockchain. The preceding example describes a secure compliance protocol initiated by the compliance monitor, in some examples, the cryptoprocessor deployed on a device may proactively push a compliance protocol event trigger.

For example, a connected vehicle (e.g., a device) may be an autonomous vehicle, and a passenger may wish to access information related to the compliance of the autonomous vehicle. In this example, a passenger may wish to know if the autonomous vehicle, at a given moment in time, is compliant with a number of provisions pertaining to local autonomous vehicle laws (e.g., speed and headlight operation). Continuing with the preceding example, the passenger may proactively initiate a secure compliance protocol utilizing a third-party application (e.g., application on a smartphone).

FIG. 3 illustrates an example of a system including a processor for facilitating secure compliance protocols consistent with the disclosure. The examples illustrated in FIG. 3 may include a non-virtual architecture, and elements may be applied to facilitate a secure compliance protocol in a similar manner as the elements illustrated in conjunction with FIG. 1. For example, the flow diagram 200 described above, in conjunction with FIG. 2 may include a non-virtual architecture.

The system 300 may include a gateway 301, a memory 303, a cryptoprocessor 304, a processor 305, an operating system 307, an agent 308, a plurality of applications 310-1, . . . , 310-N, a plurality of nodes 312-1, . . . 312-N, a plurality of Mobile Edge Computing (MEC) servers 314-1, . . . , 314-N, a plurality of Peer-to-Peer (P2P) file systems, 316-1, . . . 316-N, a plurality of blockchain applications 318-1, . . . , 318-N, a plurality of trusted time services 320-1, . . . , 320-N, a plurality of compliance monitors 322-1, . . . , 322-N, a compliance audit 324, a smart contract 326, and a mobile core network 328.

In some examples, the gateway 301 may be deployed in a device (e.g., a connected vehicle) and may include memory 303, the processor 305, the cryptoprocessor 304, the operating system 307, and/or be provisioned with a plurality of computing resources that are executed on hardware. The computing resources may include the plurality of applications 310-1, . . . , 310-N, the agent 308, and the cryptoprocessor 304. The memory 303 may be one or more memory resources such as, electronic, magnetic, optical, or other physical storage device that stores executable instructions, thus volatile memory (e.g., RAM, DRAM, SRAM, EPROM, EEPROM, etc.) and/or non-volatile memory (e.g., a HDD, a storage volume, data storage, etc.).

Although the following examples described in conjunction with FIG. 3, refer to a single processor, a single memory, and a single agent, the descriptions may also apply to a system with multiple processors and/or multiple memories and multiple agents. In such examples, the instructions may be distributed (e.g., stored) across multiple memories and the instructions may be distributed (e.g., executed by) across multiple processors. Accordingly, the processor 305 may be a central processing unit (CPU), a semiconductor-based microprocessor, and/or other hardware devices suitable for retrieval and execution of instructions stored in non-transitory computer readable medium. The processor 305 may fetch, decode, and execute instructions. As an alternative, or in addition to retrieving and executing instructions, the processor 305 may (or may not) include at least one electronic circuit that may include electronic components for performing the functionality of instructions.

The system 300, as illustrated by FIG. 3, may include the plurality of MEC servers 314-1, . . . , 314-N and each of the plurality of MEC servers 314-1, . . . , 314-N may include at least one of the plurality of Peer-to-Peer (P2P) file systems 316-1, at least one of the plurality of the blockchain applications 318-1, at least one of the plurality of trusted time services 320-1, at least one of the plurality of compliance monitors 322-1, at least one of the plurality of compliance audits 324, the smart contract 326, and each of the plurality of MEC servers 314-1, . . . , 314-N correspond to a particular node of the plurality of nodes 312-1, . . . , 312-N and the plurality of nodes 312-1, . . . , 312-N may be included in at least one mobile core network 328.

In one example, the system 300 is a non-virtualized architecture including the gateway 301 that may be deployed on a device (e.g., a connected vehicle). Continuing with this example, the agent 308 may generate content proofs (e.g., VSR files), that correspond to data/information from ECU(s) included on the connected vehicle. The ECU(s) may be controlled by at least one of the plurality of applications 310-1, . . . , 310-N. In the previous example, the memory 303 may store instructions corresponding to the agent 308, and the processor 305 may execute the instructions stored by the memory 303, and the instructions may be to authenticate a plurality of compliance protocols that may be initiated by the compliance monitor 322-1 in response to an event trigger (e.g., the connected vehicle transitioning from a first geographical location to a second geographical location).

Continuing with the previous example, the cryptoprocessor 304 may provide cryptoprocessing to the content proofs provided by the agent 308 when they are generated in response to a request for a proof of compliance. Further, the cryptoprocessor 304 may execute instructions for the agent 308 to calculate a hash for the VSR file(s), thus encrypting the content proofs so that they may be securely communicated to the MEC server 314-1 and the corresponding node 312-1. Continuing with the previous example, the compliance monitor 322-1 may initiate a request for a secure compliance protocol (e.g., a compliance proof). Accordingly, the MEC server 314-1 may securely communicate with at least one agent 308 to execute a smart contract 326, which may include at least one compliance proof based on the encrypted content proof (e.g., the hashed VSR file).

In the preceding example, the smart contract 326 may be accessed (e.g., audited) by the MEC server 314-1 corresponding to the node 312-1. The MEC server 314-1 corresponding to the node 312-N may check a compliance proof included in the smart contract 326, and the smart contract 326 may be checked by the compliance audit 324 to determine a compliance of the connected vehicle in response to the event trigger (e.g., a geographical boundary), when the node 312-1 corresponds to the first geographical location and the node 312-N corresponds to the second geographical location.

In some examples, the proof construction will include the use of a Merkle Tree construction. For example, the proof construction may describe the generation of content proofs (e.g., VSR files), for inclusion to the construction of compliance blockchains, which may secure compliance protocols for a connected vehicle. Connected vehicles may have many VSR files, and entities may require the proof construction for all of them in a device (e.g., a connected vehicle). In the examples described herein, the example device is a connected vehicle, such as an autonomous vehicle. Some examples of proof construction may utilize a hash tree (e.g., a Merkle Tree). As described herein, the term "hash tree", generally refers to a way to allow efficient and secure verification of the contents of large data structures.

For example, a Merkle Tree can be used to verify any kind of data stored, handled, and/or transferred between a computing entity (e.g., a wireless network). In examples described herein, elements of system 100 as illustrated and described in conjunction with FIG. 1 may be used as examples. It should be understood, that proof construction may be accomplished in many different ways, and examples herein are intended to illustrate examples of the disclosure and should not be taken in a limiting sense.

In some examples, on type of content proof generation is called content hash proof generation. The content hash proof generation, may not be scalable when a device (e.g., a connected vehicle) includes many content proofs (e.g., VSR files). For example, the content hash proof generation may create a unique proof for every content proof (e.g., VSR, ASR, and/or GSR file(s)) generated by the agent (e.g., the agent 108), that may be included in a connected vehicle. In some examples, utilizing the content hash proof generation may take a long time and may be impractical for large data sets.

In examples described herein, a content proof may utilize the root $VSR_r$ as a challenge to the cryptoprocessor (e.g., the cryptoprocessor 304) quote operation (e.g., the root of a Merkle Tree). The Merkel Tree Proof construction described in examples herein, may be made clear by first defining some variables. For example, connected vehicles create the following content proof for a given $VSR_i$ and may be implemented into the proof construction of the Merkle Tree. Written below is the Merkle Tree Proof Concept.

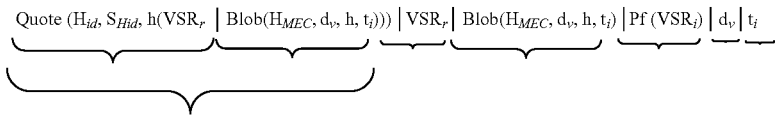

For example, consistent with the examples described above (e.g., in conjunction with FIG. 1). Where Quote ($H_{id}, s_{Hid}$, h($VSR_r$,| is the content proof generated by the agent, and where the trusted time service (e.g., 120-N) may execute operations on the MEC server (e.g., 114-N), to produce an output Blob($H_{MEC}$, $d_v$, h, $t_i$)|$t_i$. Where Blob(x), (e.g., Blob ($H_{MEC}$, $d_v$, h, $t_i$)|$t_i$) refers to the digitally signed result blob from the MEC server, $H_{MEC}$ refers to the MEC host server (e.g., the MEC server 114-N which may execute instructions to run the trusted time service 120-N and may correspond to the node 112-N). Where, $d_v$ refers to the data (e.g., a content proof), provided by the agent included on the connected vehicle and may become signed by the trusted time service. Where, h is the cryptographic hash function (e.g., calculated by the agent and may be SHA1), and where $T_i$ refers to the time stamp provided by the trusted time service deployed on the MEC server.

Continuing with the previous example, when put together, the Quote ($H_{id}, s_{Hid}$, h ($VSR_r$|Blob ($H_{MEC}$, $d_v$, h, $t_i$))), (e.g., the content proof+the trusted time blob output respectively), may be referred to as the "compute node proof." Further, the $VSR_r$ refers to the Merkel Tree root (e.g., referring to a Merkel Tree proof construction).

Continuing with the previous example, Blob ($H_{MEC}$, $d_v$, h, ti), refers again to the trusted time Blob output with the same denotation of values listed above in this example. Further, the Pf ($VSR_i$), may be the VSR file proof, and may refer to the succinct proof of $VSR_i$, which consists of the root node and all of the siblings on the path to the root node. Continuing with the previous example, $d_v$ is the vehicle supplied data, (e.g., nonce, h($VSR_i$), hello message). Finally, concatenated at the end, t, refers to the time stamp returned by the trusted time service deployed on the MEC server.

A Merkel Tree is a hash tree that may be used to construct proofs of large data sets (e.g., for a compliance proof of all of the VSR files corresponding to a connected and/or autonomous vehicle). In some examples, a blockchain record may be may be created to include a smart contract 126. For example, a digest of the compliance proof and the compliance check result (e.g., a SHA256 record) may be recorded (e.g., stored in the P2P file system 116-N and/or in the compliance blockchain). In the preceding example, the compliance blockchain may confirm the transaction for the record, when this occurs, the record is an immutable record (e.g., may be similar to a 'Proof of Existence' record).

Continuing with the preceding example, the record may be of the form $h(P_v|r)$, where h refers to the cryptographic hash function produced by the cryptoprocessor 104, R, refers to the compliance proof of the connected vehicle (e.g., constructed by the Merkle Tree in the above example), r refers to the result of the compliance check (e.g., pass/fail), and | is the concatenation operator. The records constructed in the previous example may be used to build the smart contract 126.

For example, an audit smart contract (e.g., smart contract 126) may compute a compliance state of a connected vehicle to local law and safety standards and may be created utilizing a compliance blockchain. An example of a created pseudocode for the audit smart contract is given below.

```
Receive(Proof_data, P_v)
    Pfchk_result:= check_proof(P_v)
    Compchk_result:=custom_compliance_check(Proof_data)
    Chk_result = Pfchk_result AND Compchk_result
    Store(marker_bytes||hash(P_v || Chk_result)))
```

Where the check proof involves checking the signatures, PCR state and freshness of the quote, the custom_compliance_check involves checking the compliance constraints set up by the auditor, In another example, a state check smart contract (e.g., smart contract 126) may, for example, be triggered by a third-party/interested application and it may check compliance and integrity state on a compliance blockchain and may be constructed in a similar manner using a blockchain record. An example of a created pseudocode for the state check smart contract is given below.

```
Receive(anticipated_hash)
    If Exists(marker_bytes || anticipated_hash):
        return pass;
    Else:
        return fail;
```

Where the marker_bytes are a unique string prepended to the transaction to identify it, (e.g., 0x444f4350524f4f46 in Proof of Existence), and the Anticipated_hash includes the hash the third-party interested application expects if the check passed.

The preceding examples explained in conjunction with FIG. 3 describe solving technical challenges relating to secure compliance protocols in a non-virtual environment. Additionally, the preceding examples describe proof construction and the scalability of secure compliance protocols that can be applied to dynamically changing compliance provisions, various device components, and/or various functional aspects may be desirable.

Figure 4A:
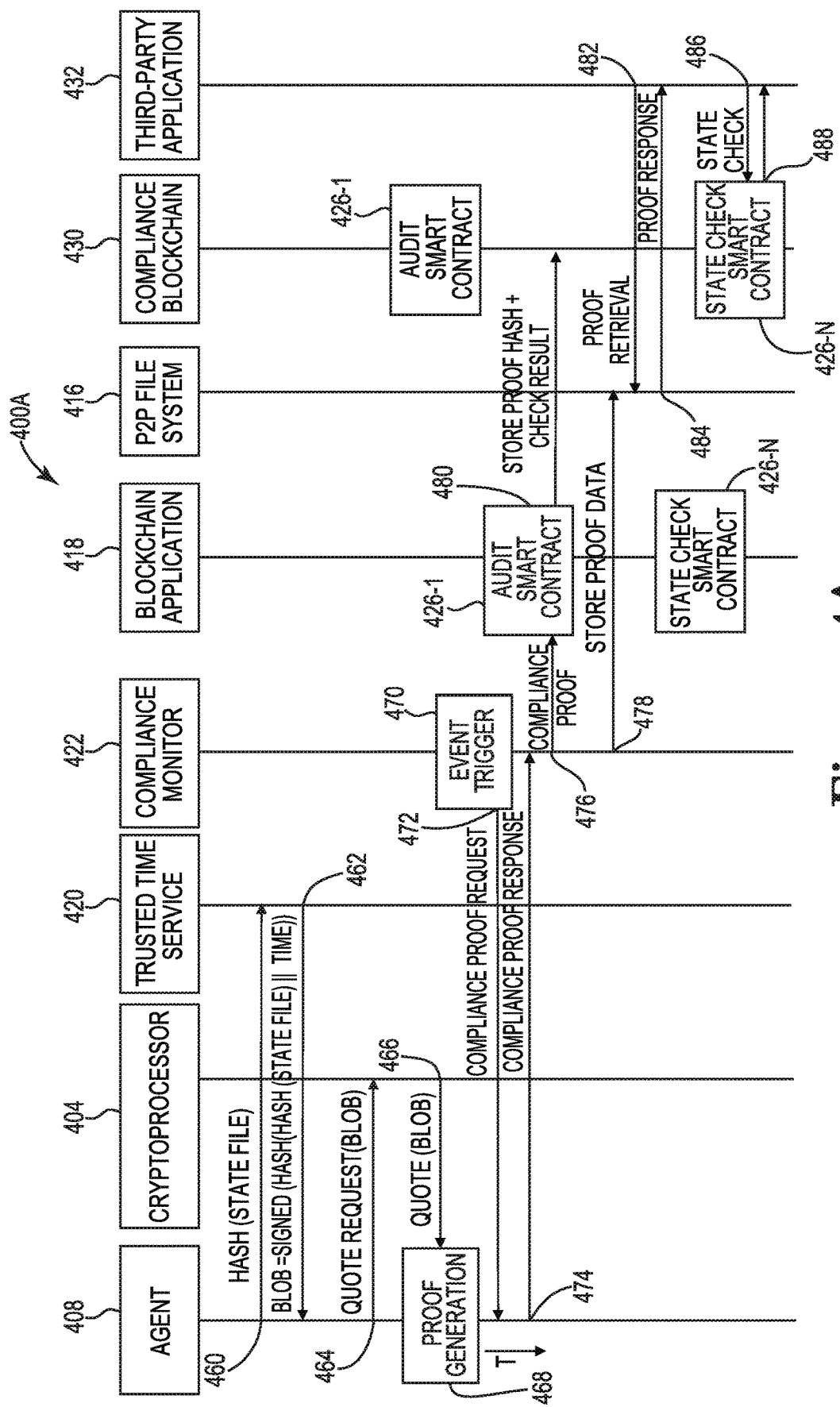
FIG. 4A illustrates an example of a secure compliance protocol message flow in response to an infrastructure event trigger consistent with the disclosure.

FIG. 4A illustrates an example of a secure compliance protocol message flow in response to an infrastructure event trigger consistent with the disclosure. The examples illustrated in FIG. 4A may be of the message flow in response to a device (e.g., a connected vehicle) experiencing an infrastructure event trigger. For example, compliance proof collection may be triggered by an event such as a connected vehicle connecting to a MEC server (e.g., the MEC 114-1) corresponding to a node (e.g., the node 112-1), not expressly illustrated in FIG. 4A or 4B. In this example, the compliance monitor 422 may initiate a proof of compliance relating to the operation of the brakes of the connected vehicle.

Continuing with the preceding example, the agent 408 may interact with the cryptoprocessor 404, at the instance 460 to encrypt a state of a VSR file (e.g., the operation of the brakes), and securely communicate with the plurality of trusted time service 420. At the instance 462, the trusted time service 420 may securely communicate a secure communication containing a time stamped content proof (e.g., Blob $(H_{MEC}, d_v, h, t_i)|t_i)$) to the agent 408, and at the instance 464 the agent 408 may transmit a quote request to the cryptoprocessor 404 and the cryptoprocessor may return a quote (e.g., Quote $(H_{id}, s_{Hid}, h(VSR_r))$) at the instance 466.

Continuing with the preceding example, the agent 408 may generate a proof of compliance 468 (e.g., a state of the connected vehicles brakes). Continuing with this example, the compliance monitor 422 may initiate an event trigger 470 and transmit a request to the agent 408 for the compliance proof at the instance 472 (e.g., proof of the state of the connected vehicles brakes). At the instance 474 the agent 408 may transmit a compliance proof response (e.g., transmit the compliance proof) to the compliance monitor 422.

Continuing with the preceding example, the compliance monitor 422 may collect the compliance proof 468, and at the instance 476, it may forward the compliance proof 468 to the blockchain application 418. The blockchain application 418 may assist with the execution of an audit smart contract 426-1, and a state check smart contract 426-N. At the instance 478 the compliance proof 468 may be securely transmitted from the compliance monitor 422 to the P2P file system 416. At the instance 480, the stored compliance proof hash with the check result (e.g., Store(marker_bytes||hash $(P_v||Chk\_result))$) may become an immutable record in the compliance blockchain 430 and/or in the record of the audit smart contract 426-1.

Continuing with the previous example, a third-party application 432 may request a retrieval (e.g., a compliance audit 124) of the compliance proof 468, from the P2P file system 416 at the instance 482, and the P2P file system may send a proof response at the instance 484. Continuing with this example, the third-party application 432, may request a state check at the instance 486 (e.g., a state of the brakes of the connected vehicle) from the state check smart contract 426-N, and the state check smart contract 426-N may send the response at the instance 488. It should be understood that while the examples, in conjunction with FIG. 4A describe one VSR file, the same protocol may be carried out with more than one VSR files, additionally the connected vehicle may have a virtual architecture and/or a non-virtual architecture, and the content proof files may also be GSR or ASR files. A similar protocol may take place when the compliance proof is requested from a client, as described in FIG. 4B.

Figure 4B:
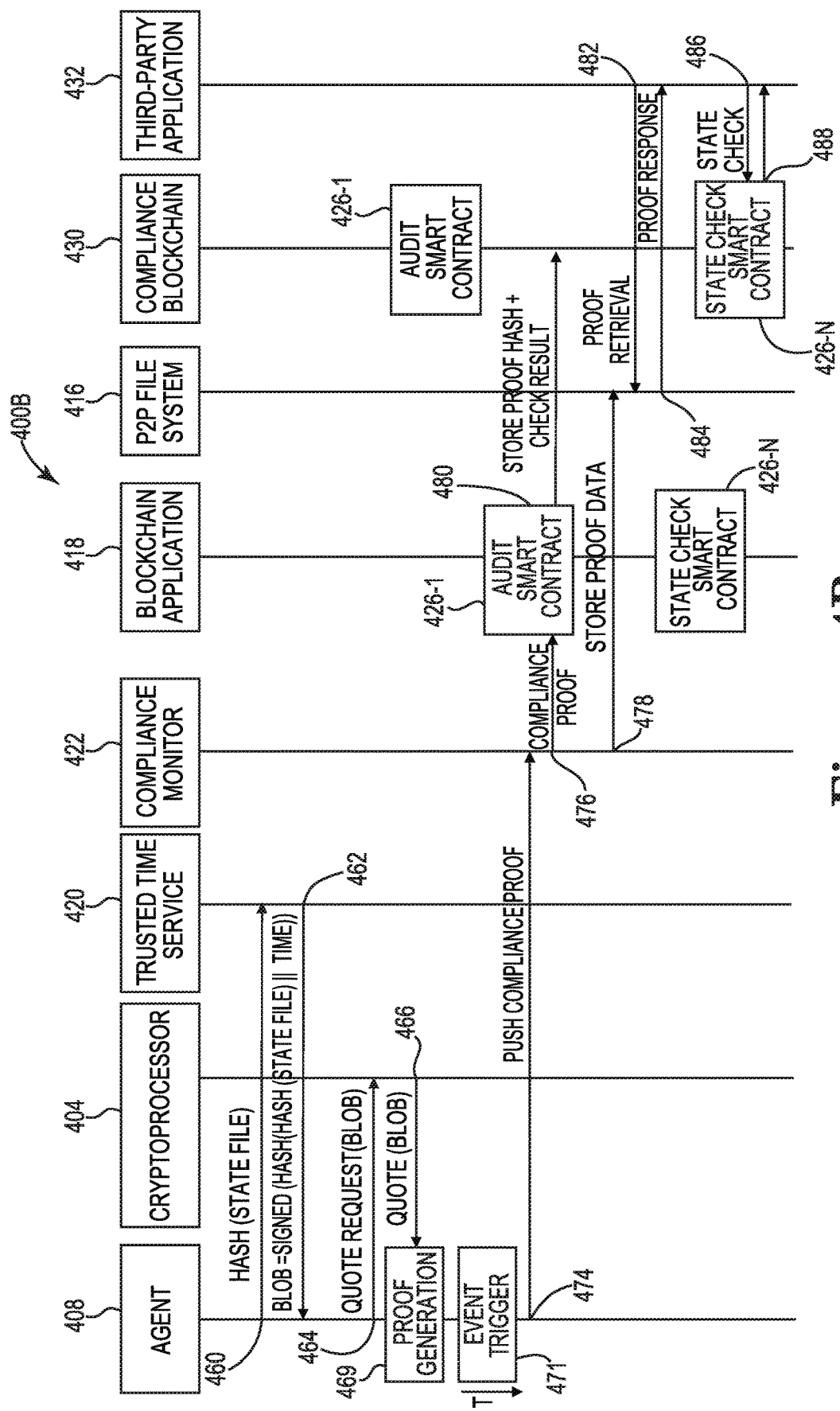
FIG. 4B illustrates an example of a secure compliance protocol message flow in response to a client event trigger consistent with the disclosure.

FIG. 4B illustrates an example of a secure compliance protocol message flow in response to a client event trigger consistent with the disclosure. In some examples, a push of a compliance protocol may correlate to a proactive event trigger (e.g., a client event trigger). For instance, where the device is a connected vehicle, the agent 408, may proactively initiate an event trigger (e.g., a push). In some examples, the push of a compliance protocol may be a regular and/or routine occurrence (e.g., starting the connected vehicle), the connected vehicle may enter or exit a geographical boundary (e.g., a geographical transition between one or more different locations).

For example, as illustrated in FIG. 4B, a connected vehicle may proactively generate a secure compliance protocol relating to an operation (e.g., operation of new headlights). Continuing with this example, the agent 408 may interact with the cryptoprocessor 404, at the instance 460 to encrypt a state of a VSR file (e.g., the operation of the headlights), and may securely communicate with the plurality of trusted time service 420. At the instance 462, the trusted time service 420 may securely transmit a secure communication containing a time stamped content proof (e.g., Blob($H_{MEC}$, $d_v$, h, $t_i$)|$t_i$)), with the agent 408. At the instance 464, the agent 408 may transmit a quote request to the cryptoprocessor 404, and the cryptoprocessor 404 may return a quote (e.g., Quote ($H_{id}$,$s_{Hid}$, h(VSR$_r$))) at the instance 466, the agent 408 may then generate a proof of compliance 469 (e.g., a state of the connected vehicles headlights at a particular time).

Continuing with the preceding example, the agent 408 may initiate an event trigger 471 and send a push to the compliance monitor 422 at the instance 474 requesting a compliance proof (e.g., proof of the state of a connected vehicles headlights), and the compliance monitor 422 may collect the compliance proof 469. Continuing with the preceding example, the compliance monitor 422 may collect the compliance proof 469 and at the instance 476 it may forward the compliance proof to the blockchain application 418, and the blockchain application 418 may assist with the execution of an audit smart contract 426-1, and a state check smart contract 426-N. At the instance 478, the compliance proof 469 may be securely transmitted from the compliance monitor 422, to the P2P file system 416. At the instance 480, the store proof hash with the check result (e.g., Store (marker_bytes||hash($P_x$||Chk_result))) may become an immutable record in the compliance blockchain 430 and/or in the record of the audit smart contract 426-1.

Continuing with the preceding example, a third-party application 432 may request a retrieval (e.g., a compliance audit 124) of the compliance proof 469 from the P2P file system 416 at the instance 482, and the P2P file system may send the proof response back at the instance 484. Continuing with this example, the third-party application 432 may request a state check at the instance 486 (e.g., a state of the brakes of the connected vehicle) from the state check smart contract 426-N, and the state check smart contract 426-N may send the response at the instance 488. It should be understood that while the examples, in conjunction with FIG. 4B describe one VSR file, the same protocol may be carried out with more than one VSR file, additionally the connected vehicle may have a virtual architecture and/or a non-virtual architecture. A similar protocol may take place when the compliance proof is requested in response to a connected vehicle transitioning from a first geographic location to a second geographic location.

Figure 5:
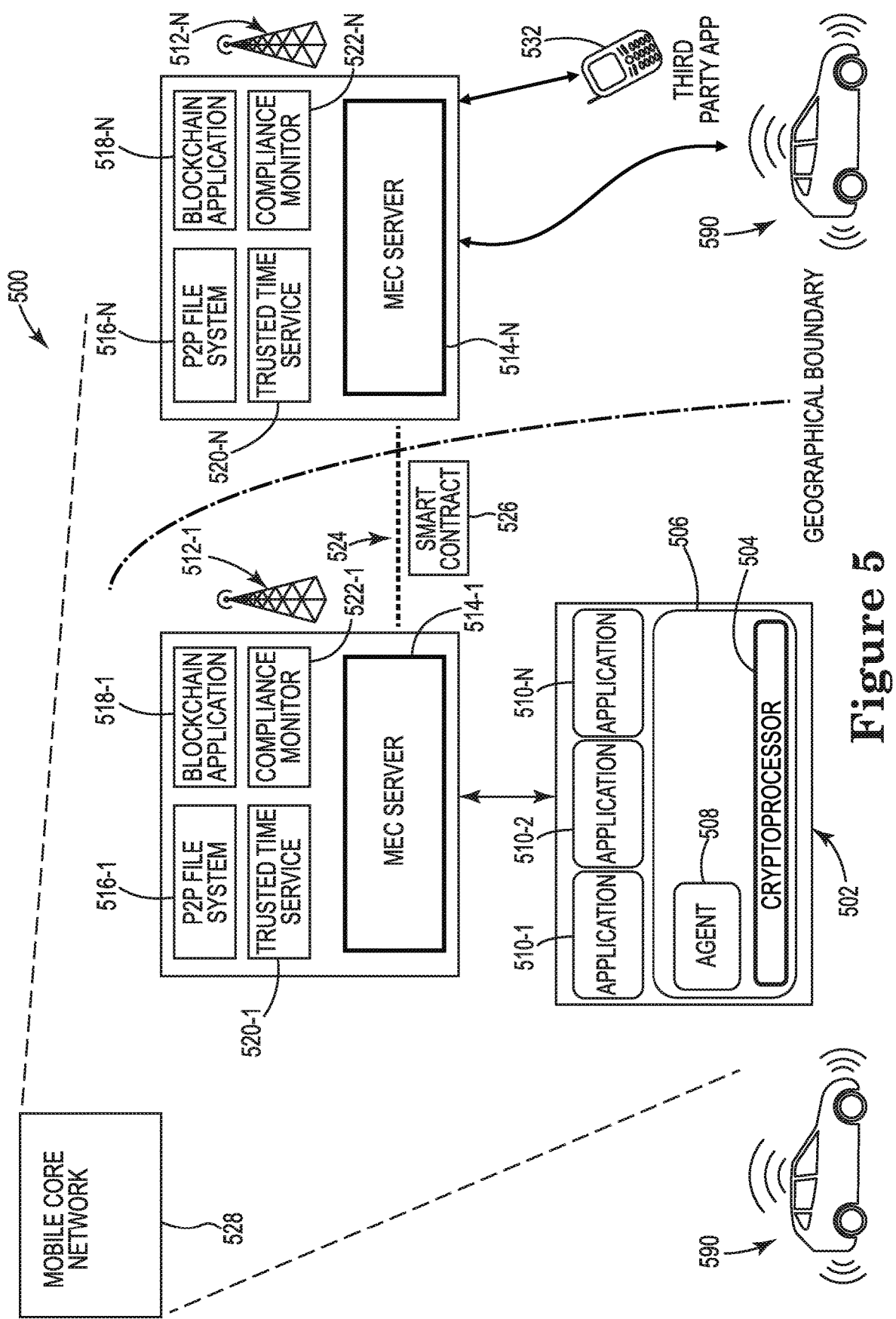
FIG. 5 illustrates an example of a vehicle including a virtualized computing instance consistent with the disclosure.

FIGS. 4A and 4B describe the message flow associated with the examples provided in conjunction with the proof construction, FIGS. 1-3 above, and FIG. 5 described herein. The message flows described in FIGS. 4A and 4B describe the message flow of examples that may solve technical challenges relating to secure compliance protocols in a virtual and non-virtual environment. The deployment of secure compliance protocols utilizing smart contracts updated by various entities (e.g., law and/or regulatory entities) may provide a practical solution to this fastly changing legal and regulatory landscape.

FIG. 5 illustrates an example of a vehicle including a virtualized computing instance consistent with the disclosure. In the example described in FIG. 5 the vehicle is a connected vehicle. It should be understood, that while the connected vehicle example described herein is described with a virtual architecture, similar operations may be carried out by a connected vehicle with the non-virtual architecture as described in conjunction with FIG. 3.

FIG. 5 illustrates an example of a system 500 including a secure compliance protocol with a virtualized computing instance. The system 500 may include a virtual computing instance (VCI) 502, a cryptoprocessor 504, a hypervisor 506, an agent 508, a plurality of applications 510-1, . . . 510-N, a plurality of nodes 512-1, . . . 512-N, a plurality of Mobile Edge Computing (MEC) servers 514-1, . . . , 514-N, a plurality of Peer-to-Peer (P2P) file systems 516-1, . . . 516-N, a plurality of blockchain applications 518-1, . . . , 518-N, a plurality of trusted time services 520-1, . . . , 520-N, a plurality of compliance monitors 522-1, . . . , 522-N, a compliance audit 524, a smart contract 526, a mobile core network 528, a connected vehicle 590 and a third-party application 532. In some examples, the VCI 502 may be deployed on the hypervisor 506 and provisioned with a plurality of computing resources that may be executed on hardware.

As illustrated in FIG. 5, the system 500 may include the VCI 502 which may be deployed on the connected vehicle 590, and the VCI 502 may include the cryptoprocessor 504 which may be deployed on the hypervisor 506. The VCI 502 may further include, an agent 508 and/or be provisioned with a plurality of computing resources that may be executed on hardware and may include the applications 510-1. In some examples, the VCI 502 of the system 500 may enable the secure communication of compliance protocols between the connected vehicle and the plurality of MEC servers 514-1, . . . , 514-N.

As illustrated in FIG. 5, the system 500, may include a plurality of MEC servers 514-1, . . . , 514-N and each of the plurality of MEC servers 514-1, . . . , 514-N may include at least one of the plurality of Peer-to-Peer (P2P) file systems 516-1, at least one of the plurality of blockchain applications 518-1, at least one of the plurality of the trusted time services 520-1, at least one of the plurality of compliance monitors 522-1, and each of the plurality of MEC servers 514-1, . . . 514-N correspond to a particular node of the plurality of nodes 512-1, . . . , 512-N. The plurality of nodes 512-1, . . . , 512-N may be included in the mobile core network 528. As illustrated in FIG. 5, the compliance audit 524, and/or the smart contract 526 may correspond to at least one of the plurality of plurality of MEC servers 514-1, . . . , 514-N. In the example described in FIG. 5, the node 512-1 may correspond to a first geographical location and node 512-N may correspond to a second geographic location.

As illustrated in FIG. 5, as the connected vehicle 590 transitions (e.g., drives) from the first geographical location and crosses the geographical boundary to the second geographical location, a secure compliance protocol may be initiated to check that the connected vehicle 590 is compliant (e.g., in the different, second location). For example, if the first geographical location is in Minnesota, and the second geographical location is in Iowa, a compliance proof may be generated by the compliance monitor 522-1 corresponding to the MEC server 514-1, further corresponding to the node 512-1 (e.g., in Minnesota). Continuing with this example, the compliance monitor 522-N corresponding to the MEC server 514-N, further corresponding to the node 512-N (e.g., in Iowa), may also generate a compliance proof.

For example, an infrastructure type of event trigger may be initiated when the connected vehicle 590 crosses the geographical boundary and a compliance proof may be generated in a manner similar to the message flow described in FIG. 4A. The compliance proof may be generated in response to local laws and DMV regulations requiring metrics correlated to the State of Iowa and/or the State of Minnesota.

A connected vehicle may produce a compliance proof proactively, and/or on-demand (e.g., by a stakeholder), to prove that a particular operation (e.g., operation of headlights, speed, level of autonomy) are within the specifications required by the entity (e.g., the local laws). In the preceding example, the message flow to generate a compliance protocol may be similar to the examples of FIG. 4B. For example, an agent 508 may generate a VSR file that may correspond to a particular application 510-1 of the plurality of applications 510-1, . . . , 510-N, and the application 510-1 may correspond to an ECU that may have functionality to control the GPS drivetrain of the connected vehicle 590.

Continuing with the preceding example, an agent 508 may interact with the cryptoprocessor 504 to generate a proof of compliance, where the proof of compliance may relate to provisions specifying conditions for the second geographical location (e.g., Iowa) and the agent 508 may initiate a geographical event trigger (e.g., a proactive event trigger), and push the compliance proof to the compliance monitor 522-1 and the smart contract 526 may be generated (e.g., by an entity) in the same manner as described in above examples.

Continuing with the preceding example, the smart contract 526 may be executed (e.g., the compliance audit 524) by the MEC server 514-1 corresponding to the node 512-1 (e.g., Minnesota), and by the MEC server 514-N corresponding to the node 512-N (e.g., Iowa). Continuing with the previous example, when the connected vehicle 590 reaches Iowa (e.g., transitions across the geographical boundary), a third-party application 532 may request retrieval of the compliance proof from the P2P file system 516-N. The third-party application 532 may be a stakeholder and/or another interested entity, and the third-party application 532 may wish to check the state of the compliance proof and initiate a compliance audit 524 on the at least one smart contract 526 (e.g., a state check smart contract), where the third-party application 532 may check the response from the requested state check.

The examples provided in conjunction with FIG. 5 describe some examples of the foregoing context of automotive and aircraft industries, where various geographical locations may have different laws, which may lead to difficulties in the practical deployment of secure compliance protocols. In the preceding examples, The United States may have inconsistent state regulations which pose a challenge to the compliance landscape, where 50 states may have 50 different regulations for vehicles. The driver of a vehicle may wish to travel across various State borders, where one State may have different regulations and/or compliance protocol provisions from another State. The deployment of secure compliance protocols utilizing smart contracts updated by various entities (e.g., law and/or regulatory entities) may provide a practical solution to this fastly changing legal and regulatory landscape.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A secure compliance protocol system comprising:
a virtual computing instance (VCI) deployed on a vehicle hypervisor and provisioned with a plurality of hardware computing resources, the VCI comprising:
a cryptoprocessor to provide cryptoprocessing to securely communicate with a plurality of nodes; and
a plurality of agents to generate a plurality of compliance proofs, wherein an agent of the plurality of agents generates a secure content proof in response to an event trigger; and
the VCI to:
communicate with a server corresponding to a node of the plurality of nodes; and
receive a time stamp corresponding to at least one compliance proof based on a metric of a connected device.

2. The secure compliance protocol system of claim 1, wherein the at least one compliance proof is at least one of a proof of safety, a proof of privacy, a proof of regulation, and a proof of local compliance laws or combinations thereof.

3. The secure compliance protocol system of claim 1, wherein the server is a Mobile Edge Computing (MEC) server and further comprises a peer-to-peer file system to store the at least one compliance proof.

4. The secure compliance protocol system of claim 3, wherein the MEC server executes a compliance audit utilizing a smart contract corresponding to two different nodes from the plurality of nodes.

5. The secure compliance protocol system of claim 1, wherein the vehicle is transitioning between a first geographical location related to a first node of the plurality of nodes and a second geographical location related to a second node of the plurality of nodes and wherein the event trigger is based on the vehicle transitioning from the first geographical location to the second geographical location.

6. The secure compliance protocol system of claim 5, wherein a compliance state of the vehicle is requested by a third-party application.

7. The secure compliance protocol system of claim 5, wherein a compliance state of the vehicle is requested by stakeholders.

8. The secure compliance protocol system of claim 5, wherein a smart contract is executed by the MEC server corresponding to the first node and wherein the MEC server and the corresponding first node are included in a compliance blockchain.

9. The secure compliance protocol system of claim 1, wherein the plurality of agents interacts with the cryptoprocessor to produce the compliance proofs of the connected device and provide the compliance proof to the server corresponding to a particular node of the plurality of nodes to be stored as an immutable record.

10. A method for secure compliance protocols, comprising:
- deploying, on a vehicle hypervisor, a virtual computing instance (VCI) provisioned with a plurality of hardware computing resources;
- deploying, on the hypervisor, a cryptoprocessor to provide cryptoprocessing to a plurality of agents and securely communicate with a plurality of servers;
- executing, by the plurality of agents, instructions to generate at least one content proof;
- executing, by the plurality of agents, instructions to generate a plurality of compliance proofs, wherein a particular compliance proof of the plurality of compliance proofs is based on the at least one content proof; and
- authenticating the particular compliance proof at a particular time, wherein a time stamp of the particular time is generated by a particular server of the plurality of servers corresponding to a first node.

11. The method of claim 10, wherein the server is a Mobile Edge Computing (MEC) server and further comprises a compliance blockchain to store a plurality of immutable compliance proof records.

12. The method of claim 11, wherein the MEC server further comprises a blockchain application to provide an interface between the compliance blockchain and an end user.

13. The method of claim 10, wherein the particular server corresponding to the first node executes a smart contract that is also executable by a different server corresponding to a second node.

14. The method of claim 10, wherein the server further comprises a compliance monitor to regulate a compliance proof collection from the at least one compliance proof based on an event trigger.

* * * * *